Patented May 27, 1952

2,597,965

UNITED STATES PATENT OFFICE 2,597,965

4-DIALKYLAMINOPHTHALIC ANHYDRIDE

Clyde S. Adams, Yellow Springs, Ohio, assignor to The National Cash Register Company, Dayton, Ohio, a corporation of Maryland No Drawing. Application April 29, 1950, Serial No. 159,149

5 Claims. (Cl. 260—342.5)

This invention relates to 4-dialkylaminophthalic anhydride compounds useful as intermediates in making triphenyl methane lactone-type compounds having dialkylamino groups in positions para to the methane carbon atom, such as, for instance, 3,3 bis(p-diethylaminophenyl)-6-diethylamino phthalide, having the structure

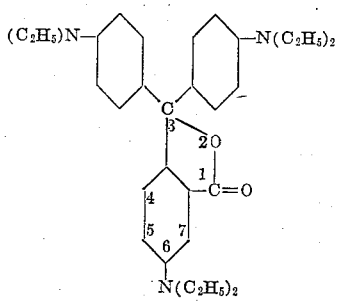

or crystal violet lactone, which is 3,3 bis(p-dimethylaminophenyl) - 6 - dimethylamino phthalide, having the structure

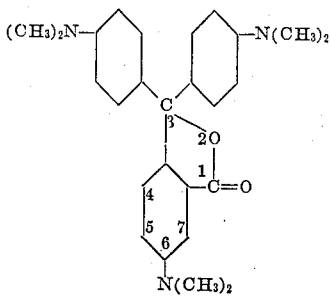

Such phthalide compounds are useful as color reactants which turn to a distinctive color when placed in adsorption contact with clay-like materials such as attapulgite and Halloysite or base exchange zeolites such as sodium aluminum silicate zeolites in the natural state or as modified by having the natural base exchange cations replaced by hydrogen or metallic ions such as iron, copper, barium and the like.

The dialkylamino substituents may be dimethyl, diethyl, dipropyl or dibutyl groups, such having been prepared.

The method of making the novel compounds will be described with reference, particularly, to 4-diethylaminophthalic anhydride, having the structure

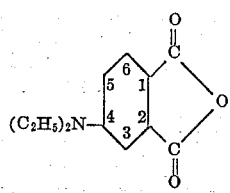

The compound 4-aminophthalic anhydride has been known, but it is useless, commercially, in the preparation of the lactone compounds mentioned as the condensation tends to take place through the amino group, i. e. the amino group of one molecule tending to combine with an oxygen atom of another molecule.

The novel compounds of this invention have no such tendency to combine with each other and, hence, may be used with tertiary aniline compounds to form the triphenyl methane lactone type of structure.

Therefore, it is an object of this invention to provide 4-dialkylaminophthalic anhydride compounds in which the dialkyl substituents may be dimethyl, diethyl, dipropyl or di-n-butyl groups.

The compound, dimethyl-4-aminophthalate, having the structure

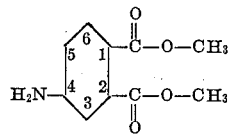

is used as a base material employed in this process, but as this compound, though described in vol. 28 (1906) of the Journal of The American Chemical Society, on pages 617-624, is not available commercially, a description of how it is made from commercially available phthalimide, having the structure

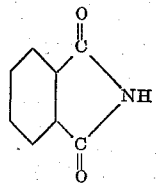

will be given first.

Phthalimide is converted to 4-nitrophthalimide, having the structure

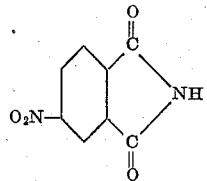

in the manner to be described in which the following reaction occurs

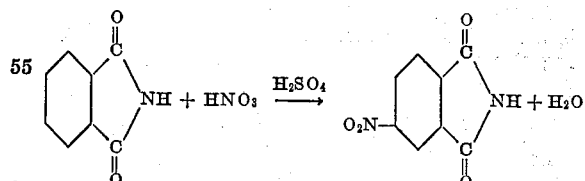

Two hundred forty cubic centimeters (5.7 moles) of C. P. fuming nitric acid (sp. g. 1.50) is added to 1.4 liters of concentrated sulphuric acid (sp. g. 1.84) in a three liter beaker and the mixture is cooled in an ice bath. As soon as the temperature of the mixed acids reaches 12° C., 200 grams (1.36 moles) of phthalimide is stirred in as rapidly as possible while the temperature of the acid mixture is kept between 10° C. and 15° C. The reaction mixture is allowed to warm to room temperature as the ice bath melts, it being left overnight in the ice bath for the purpose. The resultant clear, pale yellow solution is poured slowly onto 4.5 kilograms of cracked ice with vigorous stirring so the temperature of the mixture will not rise above 20° C. The resultant diluted reaction product is filtered through cloth on a 20 centimeter Buchner funnel, using suction, and the mass remaining on the cloth is pressed as dry as possible. The pressed cake is washed four times, each time using two liters of ice-water and filtering as before. The crude product is air-dried. This furnishes from 165–174 grams of crude 4-nitrophthalimide which is sufficiently pure for the next step in which the crude 4-nitrophthalimide is converted to 4-nitrophthalic acid, having the formula

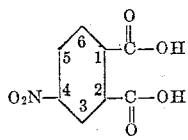

by means of the following reaction and procedural steps:

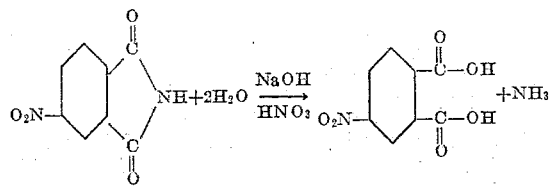

To a solution of 26.6 grams (0.66 mole) of sodium hydroxide in 240 cubic centimeters of water is added 80 grams (0.416 mole) of the dry crude 4-nitrophthalimide. The mixture is heated rapidly to the boiling point and boiled gently for ten minutes. The solution is made barely acid to litmus with concentrated nitric acid (sp. g. 1.42). After the neutral point is reached an additional 70 cubic centimeters (1.1 moles) of nitric acid is added. The solution is again boiled for three minutes, then cooled below room temperature, transferred to a 1-liter separator funnel and extracted with two 300 cubic centimeter portions of alcohol-free ether. Care is taken to ensure thorough mixing before separation of the layers. After the ether extract is dried over anhydrous sodium sulphate, the ether is evaporated until evidence of crystallization appears, then the mixture is transferred to an evaporating dish and the residual solvent allowed to evaporate over a steam bath in a hood. The 4-nitrophthalic acid separates as white crystals.

In the succeeding step the 4-nitrophthalic acid is converted to dimethyl 4-nitrophthalate, having the structure

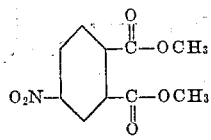

by means of the following reaction and procedural steps:

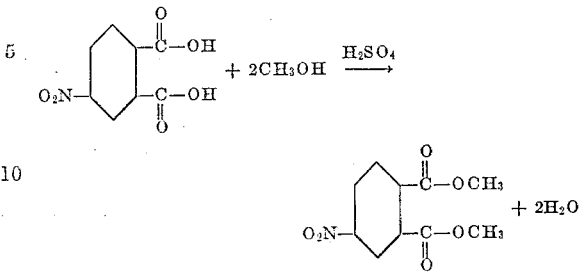

Two hundred eleven grams (1 mole) of 4-nitrophthalic acid is dissolved in three hundred thirty-eight grams of absolute methanol contained in a one-liter round-bottomed flask fitted with a reflux condenser. To this solution is added sixty-five grams of concentrated sulphuric acid (sp. g. 1.84). The resulting solution is heated on a steam bath and permitted to reflux quietly for eight hours. The condenser is then arranged for distillation and all but a small amount of the alcohol, sufficient to prevent the sulphuric acid from reacting with the product, is distilled off. The oily liquid remaining is poured into two liters of ice water and stirred for a few minutes during which time the product will crystallize. The crystals are suction-filtered, using a Buchner funnel, washed with cold water and then ground in a mortar to break up any lumps. The product is stirred with an excess of sodium carbonate solution at room temperature to dissolve any mono-methyl ester that may be present. The dimethyl ester is filtered off in a Buchner funnel, washed with water and air-dried. This crude product is sufficiently pure to use in the next step without recrystallization.

The dimethyl 4-nitrophthalate then is converted to dimethyl 4-aminophthalate, having the structure

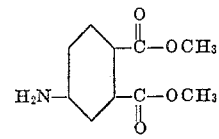

by means of the following reaction and procedural steps:

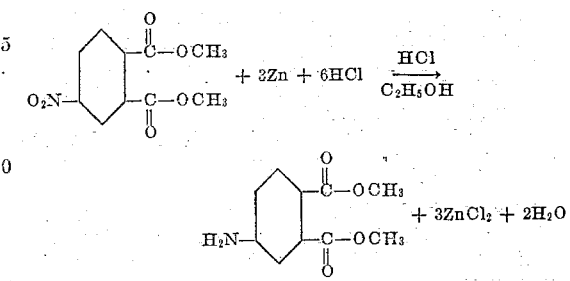

Two hundred grams (0.837 moles) of dimethyl 4-nitrophthalate is dissolved in 1000 grams of 95% ethanol and the solution introduced into a five liter, three necked, round-bottomed flask, fitted with a mechanical stirrer and thermometer. The flask is cooled by an external ice-salt bath. Two thousand grams of cold concentrated hydrochloric acid (sp. g. 1.19) are added at a rate to keep the temperature below 20° C. The solution is then cooled to 5° C.

Some separation of solid ester may take place but this condition will not interfere with the process. Two hundred eighty grams (280 grams) of zinc powder is added at such a rate that the temperature of the solution is kept at 5° C. or below, which may require as long as three hours. When the reduction is complete, the reduction mixture is suction-filtered to remove any unreacted zinc or other solids, and the filtrate is transferred to an enameled vessel together with 3000 grams of crushed ice, and stirred with the addition of cold concentrated sodium hydroxide solution until the precipitate, which at first forms, just dissolves on prolonged stirring. The temperature of the solution during this partial neutralization should not exceed 20° C. The partially neturalized solution is cooled to 5° C. and 200 grams of hydrated sodium acetate ($NaC_2H_3O_2 \cdot 3H_2O$) is added with stirring. The mixture is allowed to stand over night at 5° C. and then is suction-filtered, on a Buchner funnel, to recover the crude dimethyl 4-aminophthalate which is washed with cold water and allowed to air-dry. The crude product is pure enough for the next step in the process.

This dimethyl 4-aminophthalate has been known and is the basic material from which is made the novel compounds of this invention. Still working toward the 4-diethylaminophthalic anhydride the next is to make the new compound dimethyl 4-diethylaminophthalate which has the structure

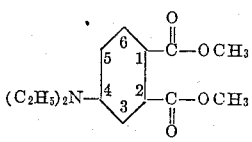

by means of the following reaction and procedural steps:

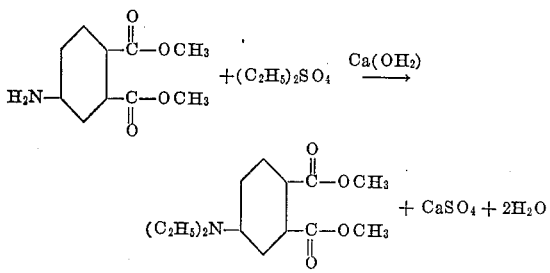

One hundred and eight grams (0.7 mole) of diethyl sulphate (sp. g. 1.1837), of 98% minimum purity, is poured into the inner vessel of a porcelain double boiler which is equipped with a porcelain lid containing three holes, one for a thermometer one for a monel-metal stirrer, and one to introduce the reactants which may also serve for attaching a reflux condenser in the later stages of the reaction. The outer vessel contains an oil bath. The diethyl sulphate is heated at 60° C. and then 105 grams (0.5 mole) of dimethyl 4-aminophthalate is added at a rate to keep the temperature under 85° C., which will require about 45 minutes. Next, 63 grams of dry hydrated lime (containing 13 per cent calcium carbonate in the particular hydrated lime which was used), is added and the temperature of the mixture raised to 110–115° C. for from 30 to 45 minutes to allow escape of the water formed in the reaction. The temperature is then raised to 140° C. and kept there 4–5 hours with constant stirring, forming a viscous light brown paste. This pasty mass, after cooling to about 50° C., is extracted with 2 liters of boiling benzene and the extraction mixture is filtered hot on a Buchner funnel. The benzene is distilled from the filtrate leaving a greenish oily residue which is crude dimethyl 4-diethylaminophthalate which may be used in the next step.

In the next step the dimethyl 4-diethylaminophthalate is converted to disodium 4-diethylaminophthalate, having the structure

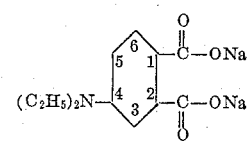

by means of the following reaction and procedural steps:

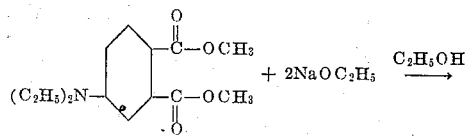

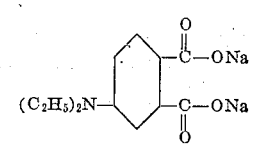

Thirty-five grams of pure metallic sodium cut in small pieces is added to 610 cubic centimeters of cold absolute ethanol contained in a 2-liter round-bottomed flask fitted with a reflux condenser. The flask and contents are kept cool by an ice bath for the 15–20 minutes required for the major part of the reaction to take place. The flask contents then are refluxed for 5 minutes on a steam bath to remove all traces of sodium. Next, 111 grams of the crude dimethyl 4-diethylaminophthalate is dissolved in one hundred fifty cubic centimeters of absolute ethanol and the solution is poured into a 1-liter round-bottomed flask fitted with a reflux condenser. Two hundred and forty-two cubic centimeters (20% in excess of theory) of the prepared sodium ethoxide solution is added to the solution of dimethyl 4-diethylaminophthalate and ethanol and the mixture refluxed for an hour over a steam bath. The resulting mixture is cooled and suction-filtered on a Buchner funnel and the filter cake is washed with absolute ethanol. When dried at 100° C. for one-half hour the residue is composed of crude disodium-4-diethylaminophthalate, the principle impurity of which is sodium sulphate. This product may be purified by dissolving it in a small amount of water and adding 95 per cent ethanol to precipitate the product.

In the next step the crude disodium 4-diethylaminophthalate is converted to 4-diethylaminophthalic anhydride, having the structure

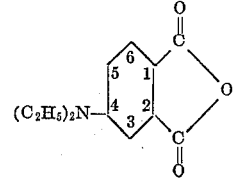

by use of the following reaction and procedural steps:

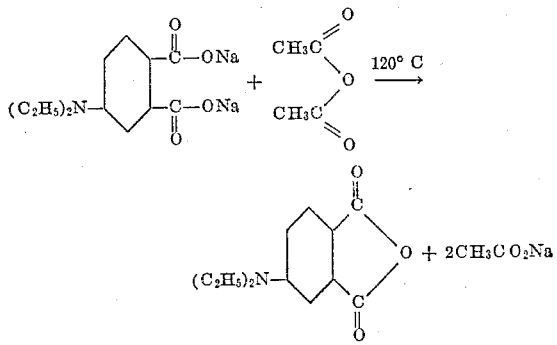

Seventy and three-hundredths grams (0.25 mole) of the crude disodium 4-diethylaminophthalate is heated with seventy-six and six-tenths grams (0.75 mole) of acetic anhydride (three times theoretical) in a covered beaker at 120° C. one-half hour. Sixty grams of anhydrous sodium carbonate (0.56 mole) is dissolved in 750 cubic centimeters of water, the solution added to the beaker and the contents are stirred, at room temperature, for 5 minutes. The sodium carbonate solution is decanted (or filtered if the product has crystallized) and the brown viscous mass obtained is washed with water by decantation. The residue is dried at 145° C. for one-half hour and on cooling it slowly crystallizes into yellow-brown granular crystals. This product is suitable for various condensation reactions without further purification.

To make the 4-dimethylaminophthalic anhydride, a similar amount of dimethyl sulphate is used in place of diethyl sulphate in the step of alkylating dimethyl 4-aminophthalate. The methylation in this case is carried out a temperature below 100° C. Similarly dipropyl sulphate or di-n-butyl sulphate may be used in place of diethyl sulphate, in the same amount to prepare the propyl and butyl homologues of the 4-diethylaminophthalic anhydride and following the above conditions.

In preparing the dipropyl and di-n-butyl homologues, mentioned, the step of converting the ester to the disodium salt makes a product difficult to filter, due to the presence of an excess of sodium ethoxide. Using three times the quantity of ethanol specified for the diethyl derivative will eliminate the difficulty.

What is claimed is:

1. The compounds having the structure

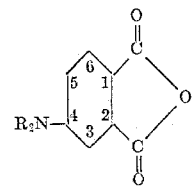

wherein R is taken from the group of alkyl radicals consisting of $CH_3$, $C_2H_5$, $C_3H_7$ and $C_4H_9$.

2. The compound 4-dimethylaminophthalic anhydride.

3. The compound 4-diethylaminophthalic anhydride.

4. The compound 4-dipropylaminophthalic anhydride.

5. The compound 4-di-n-butylaminophthalic anhydride.

CLYDE S. ADAMS.

REFERENCES CITED

The following references are of record in the file of this patent:

Taylor: J. Am. Chem. Soc., vol. 30 (1908), pp. 1135–1144.